(12) United States Patent
Lafleur (10) Patent No.: US 7,123,248 B1
(45) Date of Patent: Oct. 17, 2006

(54) ANALOG MULTI-DISPLAY USING DIGITAL VISUAL INTERFACE

(75) Inventor: Robert Lafleur, Montreal (CA)

(73) Assignee: Matrox Electronic Systems Ltd., Dorval (CA)

( * ) Notice: Subject to any disclaimer, the term of this patent is extended or adjusted under 35 U.S.C. 154(b) by 106 days.

(21) Appl. No.: 10/206,938

(22) Filed: Jul. 30, 2002

(51) Int. Cl.
*G09G 5/00* (2006.01)

(52) U.S. Cl. .................................. 345/204; 345/3.1

(58) Field of Classification Search ............... 710/260; 345/1.1–1.3, 2.1–2.3, 3.1–3.4, 204
See application file for complete search history.

(56) References Cited

U.S. PATENT DOCUMENTS

| | | | |
|---|---|---|---|
| 5,038,301 A * | 8/1991 | Thoma, III | 345/3.3 |
| 5,608,418 A * | 3/1997 | McNally | 345/3.1 |
| 5,613,092 A | 3/1997 | Lim et al. | 395/500 |
| 6,321,287 B1 | 11/2001 | Rao et al. | 710/260 |
| 6,721,881 B1 * | 4/2004 | Bian et al. | 713/1 |
| 6,724,389 B1 * | 4/2004 | Wilen et al. | 345/520 |
| 6,943,753 B1 * | 9/2005 | Shirasaki et al. | 345/3.1 |
| 2002/0149541 A1 * | 10/2002 | Shin | 345/3.1 |

* cited by examiner

*Primary Examiner*—Jimmy H. Nguyen
(74) *Attorney, Agent, or Firm*—Ogilvy Renault LLP (57) ABSTRACT

A method and interface for controlling a display monitor through a multi-channel coupler detects a type of the display monitor and selects a channel plan defining a connectivity between the channels of the coupler, based on the type of the display monitor. The channel plan defines a connectivity between the channels of the coupler and a plurality of display control signals. Each channel of the coupler is connected in accordance with the selected channel plan. The display types can be for example analog or digital. The method and apparatus can be used to drive two analog display monitors from a DVI-I compliant interface.

18 Claims, 5 Drawing Sheets

Figure 1
(Prior Art)

| Pin # | Signal | Pin # | Signal | Pin # | Signal |
|---|---|---|---|---|---|
| 1 | T.M.D.S. Data2− | 9 | T.M.D.S. Data1− | 17 | T.M.D.S. Data0− |
| 2 | T.M.D.S. Data2+ | 10 | T.M.D.S. Data1+ | 18 | T.M.D.S. Data0+ |
| 3 | Shield | 11 | Shield | 19 | Shield |
| 4 | T.M.D.S. Data4− | 12 | T.M.D.S. Data3− | 20 | T.M.D.S. Data5− |
| 5 | T.M.D.S. Data4+ | 13 | T.M.D.S. Data3+ | 21 | T.M.D.S. Data5+ |
| 6 | DDC Clock | 14 | +5 V Power | 22 | Shield |
| 7 | DDC Data | 15 | Ground (Return for +5V, HSync & VSync) | 23 | T.M.D.S. Clock+ |
| 8 | Analog Vertical Sync | 16 | Hot Plug Detect | 24 | T.M.D.S. Clock− |

Figure 2
(Prior Art)

| Pin # | Signal | Pin # | Signal | Pin # | Signal |
|---|---|---|---|---|---|
| 1 | T.M.D.S. Data2− | 9 | T.M.D.S. Data1− | 17 | T.M.D.S. Data0− |
| 2 | T.M.D.S. Data2+ | 10 | T.M.D.S. Data1+ | 18 | T.M.D.S. Data0+ |
| 3 | Shield | 11 | Shield | 19 | Shield |
| 4 | T.M.D.S. Data4− | 12 | T.M.D.S. Data3− | 20 | T.M.D.S. Data5− |
| 5 | T.M.D.S. Data4+ | 13 | T.M.D.S. Data3+ | 21 | T.M.D.S. Data5+ |
| 6 | DDC Clock | 14 | +5 V Power | 22 | Shield |
| 7 | DDC Data | 15 | Ground (Common Return for +5V, HSync & VSync) | 23 | T.M.D.S. Clock+ |
| 8 | Analog Vertical Sync | 16 | Hot Plug Detect | 24 | T.M.D.S. Clock− |
|  |  |  |  |  |  |
| C1 | Analog Red | C5 | Analog Ground (Common Return for Analog RGB) | C3 | Analog Blue |
| C2 | Analog Green |  |  | C4 | Analog HSync |

| Pin # | Signal | Pin # | Signal | Pin # | Signal |
|---|---|---|---|---|---|
| 1 | T.M.D.S. Data2- | 9 | T.M.D.S. Data1- | 17 | T.M.D.S. Data0- |
| 2 | T.M.D.S. Data2+ | 10 | T.M.D.S. Data1+ | 18 | T.M.D.S. Data0+ |
| 3 | Shield | 11 | Shield | 19 | Shield |
| 4 | Analog-B Red | 12 | Analog-B Green | 20 | Analog-B Blue |
| 5 | Analog-B HSync | 13 | Analog-B VSync | 21 | Analog-B DDC Data |
| 6 | Analog-A DDC Clock | 14 | +5 V Power (Common) | 22 | Shield |
| 7 | Analog-A DDC Data | 15 | Ground (Common Return for +5V, HSync & VSync) | 23 | T.M.D.S. Clock+ |
| 8 | Analog-A Vertical Sync | 16 | Hot Plug Detect<br><br>Analog-B DDC Clock | 24 | T.M.D.S. Clock- |
|  |  |  |  |  |  |
| C1 | Analog-A Red | C5 | Analog Ground (Common Return for Analog RGB) | C3 | Analog-A Blue |
| C2 | Analog-A Green |  |  | C4 | Analog-A HSync |

Figure 5

ANALOG MULTI-DISPLAY USING DIGITAL VISUAL INTERFACE

CROSS-REFERENCE TO RELATED APPLICATIONS

This is the first application filed for the present invention.

MICROFICHE APPENDIX

Not Applicable.

TECHNICAL FIELD

The present invention relates to the field of display monitor interfaces, and in particular to a method and apparatus for controlling a display monitor through a multi-channel coupler.

BACKGROUND OF THE INVENTION

Computers have traditionally used cathode ray tubes (CRTs) for displaying information. CRTs are inherently analog in nature, and thus traditional video interfaces use analog signals to convey display data from a computer system to a display device. A popular standard is the Video Electronics Standards Association (VESA) RGB standard for analog display devices. VESA compliant analog monitors support VESA Display Data Channel (DDC) protocol for communicating the monitor functionality to a graphics control card.

With the increasing popularity of flat panel display (FPD) technologies, (such as, for example liquid crystal displays (LCDs)), digital video interface standards have been developed. One such standard is the Digital Visual Interface (DVI) developed by the Digital Display Working Group (DDWG), a consortium of computer industry manufacturers. The DVI standard provides a high speed digital connection for display monitors that is independent of display technology. This standard provides for "plug and play" functionality, enabling a host system to automatically determine the capabilities of a monitor connected to it, and then properly format information for display on the monitor. As is well known in the art, the DVI specification currently supports two types of physical connectors: DVI-Digital (DVI-D) and DVI-Integrated (DVI-I).

The DVI-D connector supports a single digital display, and has 24 pins organized in three rows of eight contacts. The signal pin assignments are listed in the table of FIG. 1. The DVI-D connector can accommodate one or two digital links driven by Transition Minimized Digital Signaling (T.M.D.S.), which provides DC balanced signals. These digital links are used to transmit graphics data to the display. With reference to the table of FIG. 1, a first digital link consists of Data channels 0, 1 and 2 ("T.M.D.S. Data0−", "T.M.D.S. Data0+", "T.M.D.S. Data1−", "T.M.D.S. Data1+", "T.M.D.S. Data2−", "T.M.D.S. Data2+", (pins 17, 18, 9, 10, 1, 2)) as well as "T.M.D.S. Clock-" and "T.M.D.S. Clock+" (pins 24, 23). Plug and Play functionality is provided by a DDC signaling channel: "DDC Clock" and "DDC Data" (pins 6, 7) with the associated "+5V" and ground (pins 14, 15). For high resolution displays (especially high pixel format digital CRTs), the second T.M.D.S. link can be used to augment the bandwidth of the first link. The second digital link consists of Data channels 3, 4 and 5 ("T.M.D.S. Data3−", "T.M.D.S. Data3+", "T.M.D.S. Data4−", "T.M.D.S. Data4+", "T.M.D.S. Data5−", "T.M.D.S. Data5+", (pins 12, 13, 4, 5, 20, 21)) The two T.M.D.S. links share the same clock and DDC channel.

Figure 1:
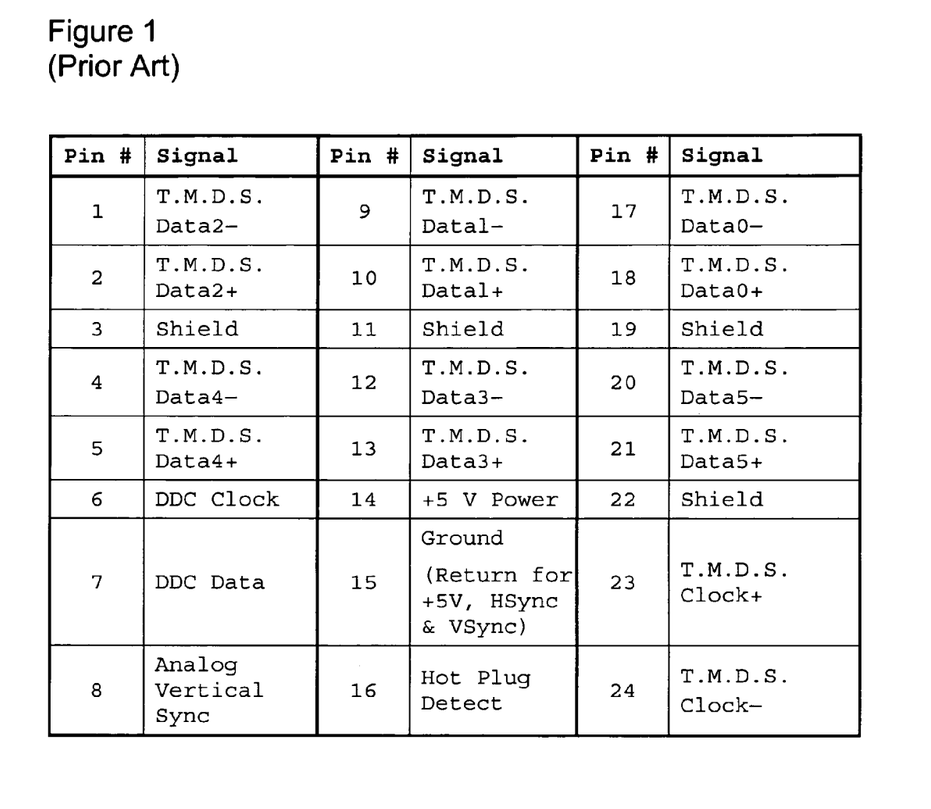
FIG. 1 is a table illustrating a prior art DVI-D connector pin list.

For the purposes of the present invention, a "channel" is defined as a single path for conveying electrical signals. For example, the T.M.D.S. "channel O" is a path for conveying digital blue video information. This channel consists of a balanced pair of conductors "T.M.D.S. Data0−" (pin 17) and "T.M.D.S. Data0+" (pin 18). By contrast, the "DDC Data" channel uses a single conductor (pin 7) referenced to ground. Therefore a "channel" can represent one or more conductors for conveying one signal.

The DVI-I connector has two digital links as in the DVI-D connector and in addition, an analog link, and can support a digital display, or an analog display. This connector has 29 pins that are divided into two sections. The signal pin assignments are listed in the table of FIG. 2. The first section is organized as three rows of eight contacts and is compatible with DVI-D. The second section of the DVI-I connector contains five contacts that are designed specifically for analog video signals. With reference to the table of FIG. 2, the analog link consists of pins C1 ("Analog Red"), C2 ("Analog Green"), C3 ("Analog Blue"), C4 ("Analog Horizontal Sync"), C5 ("Analog Ground") and 8 ("Analog Vertical Sync"). Pins 6 ("DDC Clock"), 7 ("DDC Data"), 14 ("+5V") and 15 ("Ground") are used by either the digital monitor or the analog monitor, which ever is connected.

Thus, a single DVI-I connector can support current and future digital display devices as well as maintain compatibility with legacy analog displays as follows:

A DVI compatible display device can be connected to the DVI-I system-side connector via either a DVI-D or DVI-I connector, or An RGB (VESA Video Signal Standard) analog display device can be connected to the DVI-I system-side connector using a DVI-I connector.

A limitation of the DVI-I standard interface is that dual head operation is not supported for analog displays. Thus, even when a graphics card has sufficient bandwidth to support two displays, the DVI-I interface limits the usable bandwidth, for analog displays, to a single display.

Accordingly, a system for providing analog dual-head support using a single DVI-I connector remains highly desirable.

SUMMARY OF THE INVENTION

An object of the present invention is to provide a method and system for providing analog dual-head support using a single DVI-I connector.

Accordingly, an aspect of the present invention provides a method of controlling a display monitor through a multi-channel coupler. The method comprises steps of: detecting a type of the display monitor, using at least one channel of the coupler; selecting a channel plan based on the detected display monitor type, the channel plan defining a connectivity between the channels of the coupler and a plurality of display control signals; and connecting each channel of the coupler in accordance with the selected channel plan.

Another aspect of the present invention provides an interface for controlling a display monitor through a multi-channel coupler. The interface comprises: a detector adapted to detect a type of the display monitor; a controller adapted to select a channel plan based on the detected display monitor type, the channel plan defining a connectivity between the channels of the coupler and a plurality of display control signals; and a switching means adapted to selectively connect each channel of the coupler in accordance with the selected channel plan.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

The present invention provides a method and interface for controlling a display monitor through a "multi-channel coupler" (connector), based on the display monitor type.

For convenience of description, the present invention is described herein by way of example, wherein a DVI-I compliant interface is extended to support dual analog display devices. Thus, a modified DVI-I compatible interface is presented which can support up to two DVI compatible display devices, or up to two VESA compatible analog display devices. However, those of ordinary skill in the art will appreciate that the present invention is by no means limited to such an embodiment.

Figure 3:
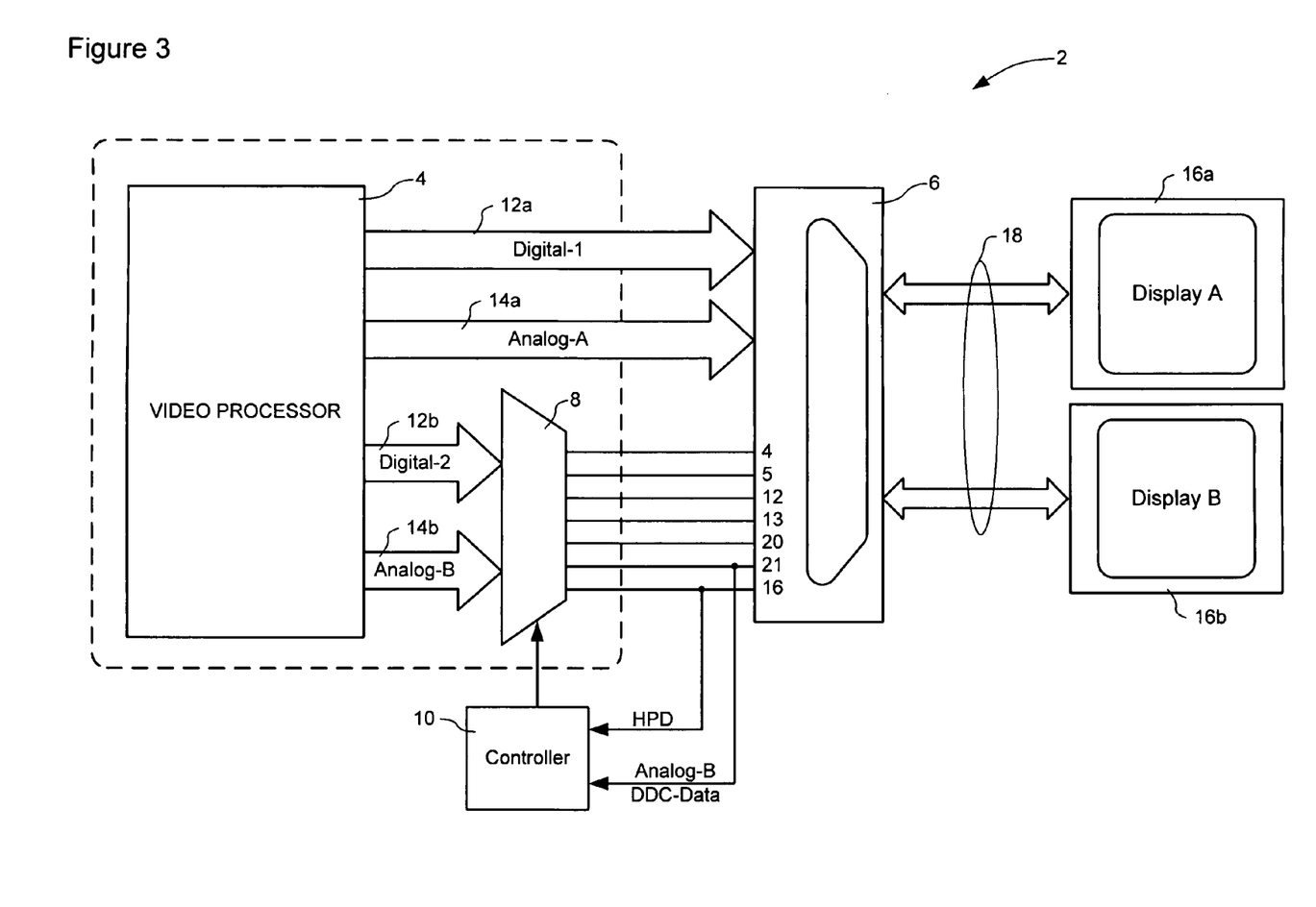
FIG. 3 is a block diagram schematically illustrating an exemplary interface for controlling a display monitor, in accordance with an embodiment of the present invention.

FIG. 3 illustrates principle elements of an exemplary interface 2 in accordance with the present invention. As shown in FIG. 3, the interface generally comprises a conventional video processor 4; a multi-channel coupler (e.g. a DVI-I compliant connector) 6; an enabler 8; and a controller 10. One or more display monitors 16 can be coupled to the connector 6 via a suitable cable 18.

The video processor 4 operates in a conventional manner to generate video signals that can be output through either a pair of digital output links 12 (Digital-1, and Digital-2) or a pair of analog output links 14 (Analog-A, and Analog-B). In the embodiment of FIG. 3, one each of the digital and analog links (i.e., Digital-1 12*a*, and Analog-A 14*a* are directly coupled to the DVI-I system side connector 6 in a conventional manner. Thus, for example, Digital-1 12*a* is coupled to TMDS channels 0, 1 and 2 (encompassing pins 1, 2, 9, 10, 17 and 18) of the DVI-I connector 6, while Analog-A 14*a* is coupled to pins C1–C5 and pin 8 in a conventional manner.

As shown in FIG. 3, the enabler 8 operates under control of the controller 10 to couple a selected one of the Digital-2 12*b* and Analog-B 14*b* links to the system-side connector 6. Continuing the above example, the enabler can be configured to couple the selected link to the TDMS channels 3, 4 and 5 (encompassing pins 4, 5, 12, 13, 20 and 21 of the connector 6.

Figure 2:
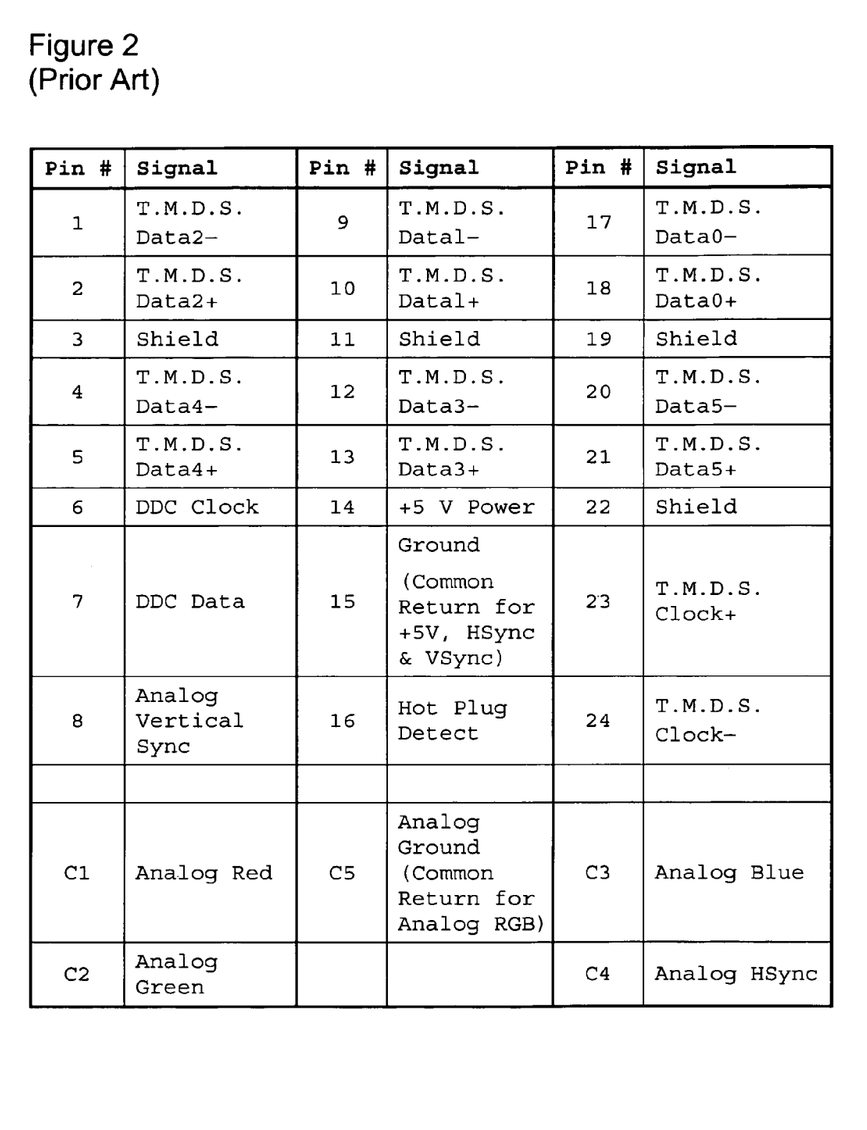
FIG. 2 is a table illustrating a prior art DVI-I connector pin list.
Figure 4:
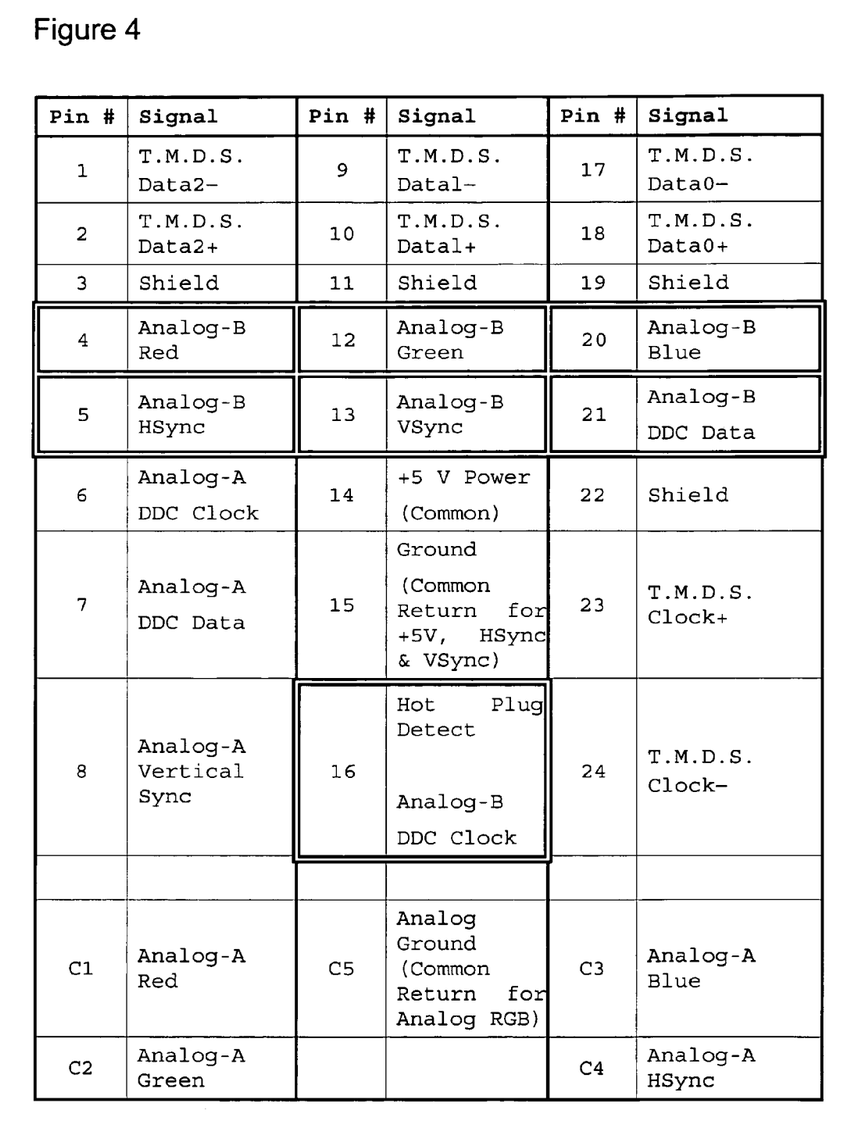
FIG. 4 is a table illustrating a modified DVI-I connector pin list for two analog interfaces, in accordance with an embodiment of the present invention.

In the case of Digital-2 12*b*, direct connections can be mapped between the video processor and the involved pins of the connector 6 in accordance with the DVI-I standard (see FIG. 2). In the case of Analog-B 14*b*, the involved pins of the connector 6 are sufficient to carry the following signals as shown in FIG. 4: pin 4 ("Analog-B Red"), pin 5 ("Analog-B Horizontal Sync"), pin 12 ("Analog-B Green"), pin 13 ("Analog-B Vertical Sync"), pin 20 ("Analog-B Blue") and pin 21 ("Analog-B DDC Data"). However, an additional pin is required to carry the Analog-B DDC Clock signal. In principle, any of the pins that are not required by either the Analog-A or Analog-B links may be used, by suitably coupling the selected pin through the enabler. In the example of FIG. 4, the HPD (pin 16) of the connector 6 is used to carry the Analog-B DDC Clock.

With reference to the table of FIG. 4, the modifications to the pin-out of a standard DVI-I connector are highlighted in boxes having a double outline. Thus, pins 4, 5, 12, 13, 20, and 21 are remapped to provide "Analog Red", "Analog Horizontal Sync", "Analog Green", "Analog Vertical Sync", "Analog Blue", and "DDC Data" signals respectively to the second analog monitor, instead of providing "T.M.D.S. Data4−", "T.M.D.S. Data4+", "T.M.D.S. Data3−", "T.M.D.S. Data3+", "T.M.D.S. Data5−" and "T.M.D.S. Data5+", that are normally provided (as shown in FIG. 2) to drive a second digital link. The other signals of the modified DVI-I compatible interface remain as in the standard DVI-I connector.

As may be appreciated, the operation of the enabler 8 is to dynamically define the channel plan (that is, the effective pin assignments) of the connector 6, under control of the controller 10. In the embodiment of FIG. 3, the enabler 8 is implemented to swap the channel plan between that of FIG. 2 and FIG. 4 by selectively coupling Digital-2 12*b* or Analog-B 14*b* to the connector 6, as discussed above. The enabler 8 may be implemented using any suitable combination of hardware and/or software to provide the desired functionality. The enabler 8 may be implemented physically separate from the video processor 4 (e.g., on a separate chip) or integrated into a common application specific integrated circuit (ASIC) with the video processor. For example, a suitable hardware implementation of the enabler may include conventional enable/disable switches on each of the lines of the Digital-2 12*b* and Analog-B 14*b* links. Downstream of the enable/disable switches, each of the lines can then be routed in a conventional manner (possibly including buffers to improve isolation, if necessary) to the relevant pins of the connector 6. Operation of the enabler 8 to define the appropriate channel plan is then simply a matter of controlling the enable/disable switches to enable the desired one of the Digital-2 12*b* and Analog-B 14*b* links. Clearly, other methods may be used to implement the enabler 8. Similarly, the enabler 8 may also be used to control more than just the Digital-2 and Analog-B links. Indeed, the enabler 8 can be used to define any arbitrary channel plan, encompassing as few, or as many of the pins of the connector 6 as desired.

As described above, the controller 10 operates to detect the type (i.e., Analog or Digital) of the monitor coupled to the connector 6, and then controls the enabler 8 to implement the appropriate channel plan. Detection of the monitor type can be accomplished in various ways. For example The DVI-I standard interface includes provision for a Hot Plug Detect (HPD) function using pin 16 of the DVI-I connector. HPD is a system level function, for which the DVI specification does not define a complete system solution. Any specific system response to the HPD pin is optional, and thus the DVI specification allows a graphics card to use the HPD pin for a variety of purposes.

For example, the HPD pin (pin 16) can readily be used as a hardware level sensor for detecting the presence of a display monitor (of any type) coupled to the system-side connector 6 via any suitable cable. The DDC data channel (e.g., pin 7) can then be used in a conventional manner to receive VESA Extended Display Identification Data (EDID) data from the monitor. As is well known in the art, the EDID data contains information identifying the type of the monitor (i.e., analog or digital). Thus the HPD pin can be used in conjunction with the DDC data channel to identify the type of monitor coupled to the system-side connector. Once the monitor type has been identified, the controller 10 can readily control the enabler 8 to implement the appropriate channel plan.

If the controller 10 detects an analog monitor via the HPD (pin 16) and DDC data lines, the controller 10 controls the enabler 8 to connect the Analog-B signal line to pins 4, 5, 12, 13, 20, 21 and 16 of the DVI-I connector 6, as shown in FIG. 4. The Analog-B DDC-clock signal is routed to the HPD signal line (pin 16) of the connector 6. Thus the HPD signal line performs two functions, namely to provide a "DDC clock" signal for the second analog display monitor while simultaneously continuing to serve as a hardware sensor for detecting the presence of a monitor. The "DDC Clock" signal on pin 16 can be provided as a buffered copy of the DDC clock signal presented on pin 6 of the DVI-I connector for use by the first analog display.

With this arrangement, backward compatibility is maintained with the standard DVI-I interface. If a DVI-I compliant digital display monitor is coupled to the DVI-I connector 6, the controller 10 will recognize that a digital display is present, and control the enabler 8 to implement the conventional channel plan illustrated in FIG. 2. That is, the signal lines of the Digital-B link (12B) will be enabled and coupled to pins 4, 5, 12, 13, 20, and 21 of the connector 6.

Figure 5:
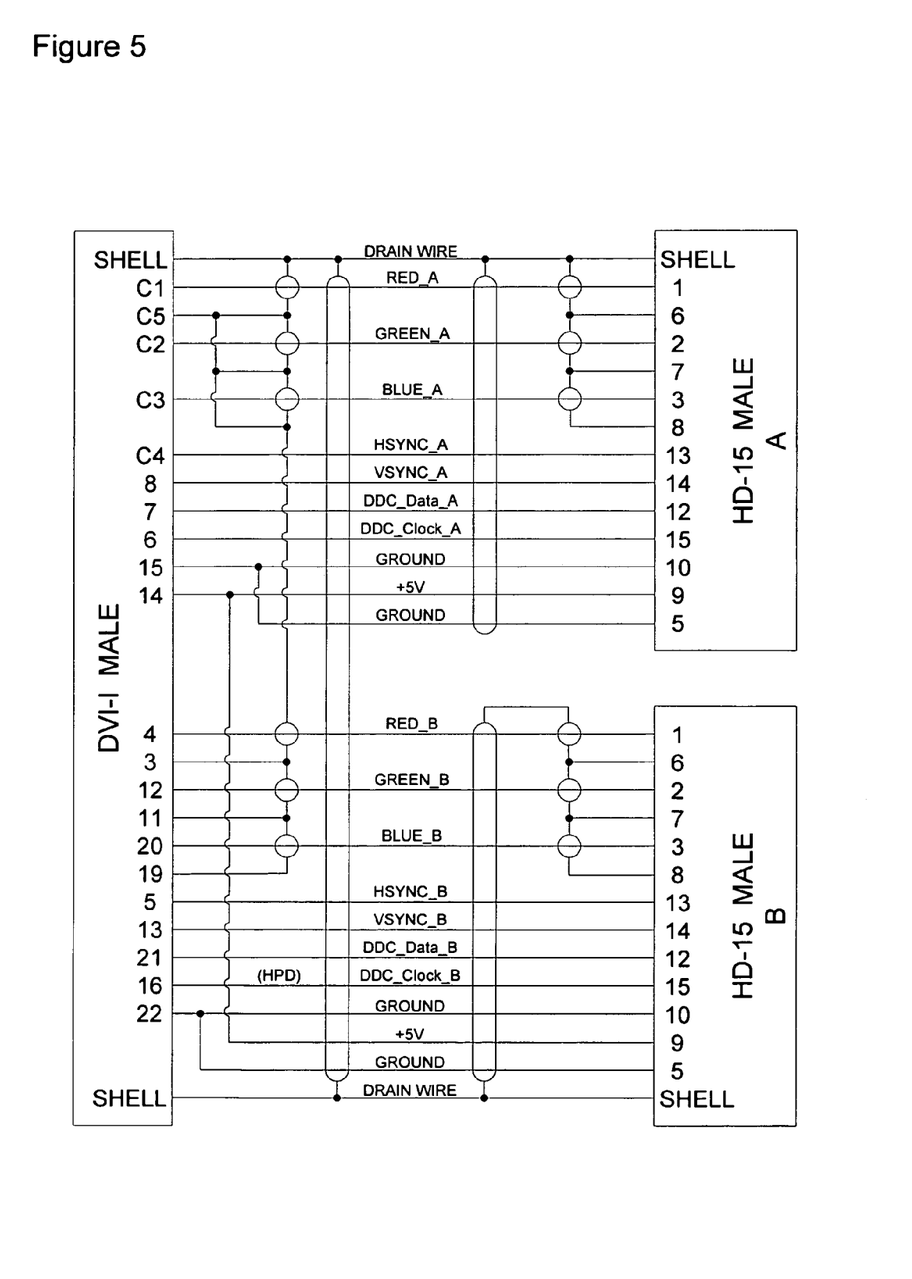
FIG. 5 illustrates signal pin assignments of an adapter cable for connecting a DVI-I system-side female connector to two HD-15 VGA connectors, in accordance with an embodiment of the present invention.

FIG. 5 is a schematic illustration of an adapter cable for coupling two VESA compliant analog monitors (each having standard HD-15 connectors, to the connector 6 with the channel plan of FIG. 4, thus enabling two separate standard RGB analog display devices to be controlled through the connector 6. The signal lines for display monitor A 16a (i.e. "Analog-A Red", "Analog-A Green", "Analog-A Blue", "Analog-A Horizontal Sync", "Ground", "Analog-A DDC Clock", "Analog-A DDC Data", "Analog-A Vertical Sync", and "+5V") are mapped from the standard DVI-I analog signal pins (that is, pins C1, C2, C3, C4, C5, 6, 7, 8, 14 and 15—see FIG. 4) to corresponding pins of a standard HD-15 connector.

The signal lines for display monitor B 16b (i.e. "Analog-B Red", "Analog-B Horizontal Sync", "Analog-B Green", "Analog-B Vertical Sync", "Analog-B Blue", "Analog-B DDC Data", "Analog-B DDC Clock" and "Ground" respectively) are mapped from the channel plan of FIG. 4 (pins 4, 5, 12, 13, 20, 21, 16 and 22 as shown in FIG. 4) to corresponding pins of a standard HD-15 connector. The "+5V" signal from pin 14 on the DVI-I connector also supplies +5 volts to the second HD-15 connector.

The embodiment(s) of the invention described above is(are) intended to be exemplary only. The scope of the invention is therefore intended to be limited solely by the scope of the appended claims.

I claim:

1. A method for controlling two display monitors through a multi-channel coupler having a channel plan, the method comprising:

simultaneously connecting the two display monitors to the coupler;

detecting a type of display monitor for each of the two display monitors using a channel of the coupler;

modifying the channel plan for said coupler based on at least one of the detected display monitor types, the modified channel plan defining a pin assignment for the coupler, wherein the assignment is for at least one of analog and digital signals; and connecting each channel of the coupler in accordance with the modified channel plan to enable said controlling of the two display monitors.

2. A method as claimed in claim 1, wherein the type of each one of the two display monitors consists of one of analog and digital.

3. A method as claimed in claim 1, wherein the channel plan is selected from a set of at least two predetermined channel plans.

4. A method as claimed in claim 3, wherein at least one of the channel plans supports a standard interface on the multi-channel coupler.

5. A method as claimed in claim 4, wherein the standard interface is DVI-I.

6. A method as claimed in claim 3, wherein at least one of the channel plans supports a standard interface through an adapter connected to the multi-channel coupler.

7. A method as claimed in claim 6, wherein the standard interface is a VESA video signal standard.

8. A method as claimed in claim 1, wherein the step of connecting each channel of the coupler comprises selectively coupling each channel of the coupler to a circuit providing a respective display control signal.

9. A method as claimed in claim 1 further comprising: using an adapter cable for simultaneously coupling said two display monitors to said single multi-channel coupler, said adapter cable comprising:

a first connector for coupling to said multi-channel coupler;

a second connector and a third connector, each for coupling to one of said two display monitors; and a cable adapted to exchange signals between said first connector and each of said second and third connectors;

said first connector having a pin assignment that is compatible with said pin assignment of said multi-channel coupler.

10. An interface for controlling two display monitors simultaneously connected through a multi-channel coupler having a channel plan, the interface comprising:

a controller for detecting a type of display monitor for each of the two monitors being simultaneously connected to the coupler and for modifying the channel plan for the coupler based on at least one of the detected display monitor types, the modified channel plan defining a pin assignment for the coupler, wherein the assignment is for at least one of analog and digital signals; and a switching means for selectively connecting each channel of the coupler in accordance with the modified channel plan to enable said controlling of the two display monitors.

11. An interface as claimed in claim 10, wherein the switching means is adapted to couple each channel of the coupler to a circuit providing a respective display control signal.

12. An interface as claimed in claim 11, wherein the respective display control signals comprise either one of analog and digital signals.

13. An interface as claimed in claim 10, wherein the controller is adapted to detect the type of a given display monitor in the presence of display control signals on the at least one channel of the coupler.

14. An interface as claimed in claim 10, wherein the type of each of the two display monitors consists of one of analog and digital.

15. An interface as claimed in claim 10, wherein at least one of the channel plans supports a standard interface on the multi-channel coupler.

16. An interface as claimed in claim 15, wherein the standard interface is DVI-I.

17. An interface as claimed in claim 10, wherein at least one of the channel plans supports a standard interface through an adapter connected to the multi channel coupler.

18. An interface as claimed in claim 17, wherein the standard Interface is a VESA video signal standard.

* * * * *

UNITED STATES PATENT AND TRADEMARK OFFICE
CERTIFICATE OF CORRECTION

PATENT NO. : 7,123,248 B1
APPLICATION NO. : 10/206938
DATED : October 17, 2006
INVENTOR(S) : Robert Lafleur It is certified that error appears in the above-identified patent and that said Letters Patent is hereby corrected as shown below:

Column 6, line 6, there should be a semi-colon after the word "coupler".

Signed and Sealed this

Twentieth Day of March, 2007

JON W. DUDAS
*Director of the United States Patent and Trademark Office*